(12) United States Patent
Baumgarten et al.

(10) Patent No.: US 9,072,408 B2
(45) Date of Patent: Jul. 7, 2015

(54) FITTING PART FOR ATTACHMENT TO A COOKING OR ROASTING VESSEL

(75) Inventors: Ralf Christian Baumgarten, Neunkirchen (DE); Michael Besche, Betzdorf (DE); Stefan Klaus, Wilnsdorf (DE)

(73) Assignee: Baumgarten Handle Systems KG, Neunkirchen (DE)

( * ) Notice: Subject to any disclaimer, the term of this patent is extended or adjusted under 35 U.S.C. 154(b) by 0 days.

(21) Appl. No.: 14/115,277

(22) PCT Filed: Apr. 27, 2012

(86) PCT No.: PCT/EP2012/057818
§ 371 (c)(1),
(2), (4) Date: Dec. 20, 2013

(87) PCT Pub. No.: WO2012/150192
PCT Pub. Date: Nov. 8, 2012

(65) Prior Publication Data
US 2014/0103672 A1    Apr. 17, 2014

(30) Foreign Application Priority Data
May 4, 2011 (DE) .......................... 10 2011 075 204

(51) Int. Cl.
*A47J 45/07* (2006.01)

(52) U.S. Cl.
CPC .............. *A47J 45/07* (2013.01); *Y10T 16/4707* (2015.01); *A47J 45/071* (2013.01)

(58) Field of Classification Search
USPC ............ 16/425, 422, 427, 426, 429; 220/759, 220/757
See application file for complete search history.

(56) References Cited

U.S. PATENT DOCUMENTS 1,364,552 A * 1/1921 Hill ................................ 220/759
2,450,193 A * 9/1948 Galliano ......................... 16/425
(Continued)

FOREIGN PATENT DOCUMENTS

DE    93 15 144 U1    2/1994
DE    201 08 901 U1    8/2001
(Continued)

OTHER PUBLICATIONS

International Search Report for corresponding International Application No. PCT/EP2012/057818 mailed on Sep. 5, 2012.
(Continued)

*Primary Examiner* — Jeffrey O Brien
(74) *Attorney, Agent, or Firm* — Billion & Armitage; Benjamin C. Armitage

(57) ABSTRACT

The invention relates to a fitting part (01) for manually handling a useful object, in particular a cooking or roasting vessel, having a carrying part (02) which can be fixedly connected to the wall of the object or of the vessel or is a constituent part of the wall, having a handle part (07) which can be pushed onto the carrying part (02) in a joining direction and can be detachably attached thereto, having a latching device, in which the latching element can be moved from an unlocked position and into a locked position by means of a spring force, wherein the latching element in the locked position bears with a latching surface against an abutment in order to prevent the handle part (07) from being removed from the carrying part (02), wherein an operating element for unlocking the latching device is provided, the operating element and the abutment being arranged on the handle part (07) and the latching element being arranged on the carrying part (02).

18 Claims, 5 Drawing Sheets

(56) References Cited

U.S. PATENT DOCUMENTS

| | | | | |
|---|---|---|---|---|
| 2,478,784 | A * | 8/1949 | Serio | 16/425 |
| 2,494,159 | A * | 1/1950 | Bernstein | 220/759 |
| 2,501,940 | A * | 3/1950 | Hibbard | 16/425 |
| 3,010,688 | A * | 11/1961 | Serio | 16/425 |
| 3,272,547 | A * | 9/1966 | Pryce | 220/759 |
| 3,306,648 | A * | 2/1967 | Serio | 220/759 |
| 3,474,486 | A * | 10/1969 | Serio et al. | 220/759 |
| 4,825,505 | A * | 5/1989 | Witte | 16/425 |
| 5,509,173 | A * | 4/1996 | LaSaosa | 220/759 |
| 5,660,300 | A * | 8/1997 | Demetrio | 16/425 |
| 6,341,714 | B1 * | 1/2002 | Bogani | 16/425 |
| 6,439,420 | B1 * | 8/2002 | Park | 220/759 |
| 6,439,421 | B1 * | 8/2002 | Lin | 220/759 |
| 6,666,132 | B2 * | 12/2003 | Dodane | 16/425 |
| 6,694,868 | B1 * | 2/2004 | Hung | 16/425 |
| 6,708,373 | B2 * | 3/2004 | Dodane | 16/425 |
| 7,311,023 | B2 * | 12/2007 | Ponzini | 16/422 |
| 7,611,179 | B2 * | 11/2009 | Lorthioir et al. | 16/425 |
| 7,883,129 | B2 * | 2/2011 | Jung et al. | 220/759 |
| 7,975,874 | B2 * | 7/2011 | Scott et al. | 220/759 |
| 8,235,245 | B2 * | 8/2012 | Lorthioir | 220/759 |
| 8,302,807 | B2 * | 11/2012 | Baumgarten | 220/759 |
| 8,402,610 | B2 * | 3/2013 | Boes | 16/425 |
| 8,448,807 | B2 * | 5/2013 | Wu et al. | 16/425 |
| 8,484,805 | B2 * | 7/2013 | Munari | 16/425 |
| 2006/0006186 | A1 * | 1/2006 | Lorthioir et al. | 220/759 |
| 2006/0081136 | A1 * | 4/2006 | Lorthioir et al. | 99/584 |
| 2006/0096996 | A1 * | 5/2006 | Lorthioir et al. | 220/759 |
| 2007/0228056 | A1 * | 10/2007 | Hoff et al. | 220/759 |
| 2008/0006645 | A1 * | 1/2008 | Sup | 220/759 |
| 2008/0110910 | A1 * | 5/2008 | Kleppin | 220/759 |
| 2009/0039096 | A1 * | 2/2009 | Lorthioir | 220/759 |
| 2009/0045207 | A1 * | 2/2009 | Lorthioir | 220/759 |
| 2009/0049650 | A1 * | 2/2009 | Cuillery et al. | 16/425 |
| 2009/0193626 | A1 * | 8/2009 | Boes | 16/425 |
| 2009/0199366 | A1 * | 8/2009 | Coudurier | 16/425 |
| 2009/0236352 | A1 * | 9/2009 | Xie et al. | 220/756 |
| 2010/0031475 | A1 * | 2/2010 | Scott et al. | 16/425 |
| 2010/0288783 | A1 * | 11/2010 | Park | 220/759 |
| 2011/0005037 | A1 * | 1/2011 | Kim | 16/422 |
| 2011/0284565 | A1 * | 11/2011 | Corbin et al. | 220/759 |
| 2012/0073085 | A1 * | 3/2012 | Munari | 16/425 |
| 2014/0076911 | A1 * | 3/2014 | Bogani | 220/759 |

FOREIGN PATENT DOCUMENTS

| | | |
|---|---|---|
| DE | 20 2006 014 409 U1 | 2/2007 |
| DE | 20 2007 000 613 U1 | 3/2007 |
| WO | WO 2010/111804 A1 | 10/2010 |

OTHER PUBLICATIONS

International Preliminary Report on Patentability for corresponding International Application No. PCT/EP2012/057818 mailed on Nov. 14, 2013.

* cited by examiner

FITTING PART FOR ATTACHMENT TO A COOKING OR ROASTING VESSEL

This application is a National Stage Application of PCT/EP2012/057818, filed on 27 Apr. 2012, which claims benefit of Application No. 10 2011 075 204.8, filed on 4 May 2011 in Germany and which applications are incorporated herein by reference. A claim of priority to all, to the extent appropriate, is made.

The invention relates to a fitting part for manually handling a useful object, in particular of a cooking or roasting vessel, having a carrying part and a handle part which can be pushed onto the carrying part and detachably attached thereto, according to the preamble of claim 1. From the state of the art, various embodiments of fitting parts comprising removable handles are known. To allow for a one-handed operation and to ensure a tight connection in the mounted state, the handles are usually fixed to the carrying part by means of a pivoting motion. One example for an embodiment of this kind is shown in DE 20 2006 014 409 U1. The not necessarily intuitive type of motion and the usually complex structure of the latching mechanism are disadvantageous in an embodiment of this kind in which the handle part is attached to the carrying part by means of a pivoting motion.

The structure can be significantly simplified and also the attachment of the handle part on the carrying part can be implemented in a manner more easily understandable to the user if a joining motion with a linear joining direction can be carried out starting from the handle part in the direction of the carrying part. An example for a fitting part of this kind is shown in DE 93 15 144 U1. There, the carrying part on the cooking vessel is embodied in the form of a sleeve, the handle part having an attachment portion complementary thereto. Said attachment portion can thus be inserted into the sleeve and in this manner it connects the handle part with the carrying part. The detachable connection is realized by a latching device, a latching element being movably mounted at the fastening portion in the handle part. Said latching element is pushed by a pressure spring perpendicularly to the joining direction into a recess in the sleeve portion. Thus, the form-fitting insertion of the latching element into the recess in the sleeve portion effects the secure connection of the handle part to the carrying part. To remove the handle part from the carrying part or from the cooking vessel, the latching element must be pushed by direct operation completely down into the attachment portion and, subsequently, the handle part can be pulled off the carrying part. With this embodiment, a particularly simple and intuitive attachment of the handle part to the carrying part is possible. Moreover, the embodiment is characterized by a particularly simple structure.

However, it has proven to be especially disadvantageous that the direct operation of the latching element leads to an inacceptable risk of injury. This is caused in particular by the fact that the sleeve portion surrounding the latching element in a hot cooking vessel also has an increased temperature. Thus, an operation of the latching element inevitably leads to a contact with the hot area of the sleeve portion. This fact alone leads to a non-applicability of the previously described solution. Furthermore, a risk of injury is given because after pushing down the latching element, the latter still has to be pushed down in the first path portion when the handle part is being removed and thus there is the risk that the finger may become wedged between the latching element and the recess in the sleeve. This second risk of injury, too, leads to a decision against an embodiment of this kind. As a result, versions comprising a pivoting-in of the handle part on the carrying part are selected in practical use. Therefore, it is the object of the present invention to provide a fitting part that has a simple structure, is attachable in a linear joining direction and does not pose any risk of injury in handling.

The object is attained by an embodiment according to the invention as set out in claim 1.

Advantageous embodiments of the invention are the subject matter of the dependent claims.

A generic fitting part for manually operating a useful object, in particular a cooking or roasting vessel, first of all comprises a carrying part and a handle part. In this context, the carrying part can be fixedly connected to the wall of the useful object or vessel or it is a constituent part of the wall of the useful object or vessel. The handle part herein can be pushed onto the carrying part in a joining direction and be detachably attached thereto. In this context, it is relevant that the joining direction extends in a substantially, at least largely straight line and that, in contrast, no otherwise common pivoting motion is required. In this regard, it is immaterial if owing to the free space present between the carrying part and the handle part during the joining, the joining motion itself is not exactly linear, but has a form of motion deviating therefrom within the free space.

Furthermore, the fitting part comprises a latching device in which a latching element can be moved by means of a spring force from an unlocked position into a locked position. Thus, without influence from the outside, the latching element is in the locked position as a base position. This is true for the joined state as well as for the state in which the handle part is removed from the carrying part. The origin of the spring force is initially immaterial. At least, an elastic deformation is required so that a repeated operation and reset of the latching element can take place. For securing the handle part on the carrying part, a latching surface of the latching element bears against an abutment in the locked position. In this manner, a removal of the handle part from the carrying part is prevented.

Hence, the generic fitting part is characterized by the handle part being attached to the carrying part via a substantially linear joining direction, the handle part being secured on the carrying part by means of a latching device and the unintended removal being prevented.

According to the invention, it is now envisaged that, furthermore, an operating element for unlocking the latching device is arranged. Thus, this embodiment differs from the state of the art in that an additional operating element is provided that is separate from the latching element. It is substantial for the embodiment according to the invention that both the operating element and the abutment are arranged on the handle part and the latching element is arranged with the latching surface on the carrying part.

By means of the solution according to the invention it is made possible to attach and remove the handle part in a simple intuitive manner to and from the carrying part. Further, a comparatively simple structure of the fitting part is realized by means of the embodiment according to the invention so that production costs and production risks can be reduced significantly as compared to the pivot handles. The newly created fitting part according to the invention is in particular characterized in that the latching element is arranged on the carrying part and thus remains on the useful object or vessel while the operating element is associated with the handle part. Thus, on the one hand, it can be made sure that the operating element and the surrounding area do not have the temperature prevailing on the cooking vessel, but can be handled without danger since now the latching element with potentially higher temperatures is operated indirectly via the operating element. On the other hand, a crushing hazard due to the relative motion between the latching element and the abutment during removal can be prevented in this manner since now the operating element is moved together with the handle part.

Moreover, as regards the fitting part, the operating element can come to bear against an operating surface of the latching element. In this context, the geometric shape of the operating surface is initially immaterial. At least, the operating element acts on the latching element via the operating surface when being operated. Functionally, it is now especially advantageous if the joining direction and an orthogonal normal vector form an obtuse angle with the operating surface. With respect to the orientation of the joining direction and the normal vector, reference is made to the exemplary figures. Thus, the embodiment differs from the state of the art by the deviation from the operation of the latching element taking place perpendicularly to the joining direction.

By means of the particularly advantageous embodiment, it can be largely ensured that a lifting of a vessel with the removable handle part takes place only if the handle is latched to the carrying part. In the state of the art, an undefined intermediate position, in which it is not obvious whether a latching has taken place or not, cannot be excluded. This disadvantage is substantially eliminated by the embodiment according to the invention. Either an automatic complete latching into the final position takes place during the latching process once a dead center has been overcome or the carrying portion basically slides out of the sleeve portion again before reaching the dead center.

In this context, it is particularly advantageous if the angle is greater than 98°, the angle being greater than 120° at least in the locked position. Owing to the mobility of the latching element, the operation and thus an accompanying displacement of the latching element leads to a change of the orientation of the normal vector as a function of the design of the latching element and of the operating surface. Thus, the angle greater than 98° has reference to any state from the locked position to the unlocked position.

In this context, it further is particularly advantageous if the operation by means of the operating element leads to an at least proportional operating force in the direction of the normal vector, the operating force comprising an extension force acting against the joining direction. This means that during operation of the operating element, a force is acting from the operating element on the latching element and thus on the carrying part, said force being oriented against the joining direction and thus causing the carrying part to be pushed out of the handle part. It is obvious that the proportion of the extension force depends on the respective current angle between the joining direction and the orthogonal normal vector.

With regard to the advantageous implementation of the operating surface and thus of the definition of the position of the normal vector, it is to be taken into account that a maximally large angle does lead to a correspondingly large extension force by operation, but that an unlatching of the latching element at the abutment is virtually prevented. Thus, the skilled person will usually select an angle as perpendicular as possible between the joining direction and the resulting normal vector. However, in this contradiction, it is especially advantageous to provide for a corresponding angle of greater than 120° in the locked position. Thus, it is advantageous to also select the angle smaller than 150°, particularly advantageously smaller than 130°.

By means of the particularly advantageous embodiment, an unexpected effect is achieved. The operation leads to a impulsive detachment, so to speak, of the carrying part from the handle part by the simultaneously occurring unlocking of the latching surface on the abutment and the extension force acting on the latching element and thus on the carrying part. Thus, when the operating element is operated, the carrying part together with the useful object or vessel is detached automatically from its connection to the handle part. I.e. it is unnecessary to hold the useful object or the vessel in order to operate them or to even pull them in the other direction.

In a first advantageous embodiment, in order to generate the spring force, the latching element is designed to be elastically deformable and thus it also forms a spring element. In a particularly simple embodiment, a correspondingly contoured leaf spring can be utilized for this purpose. This version is characterized by a particularly cost-effective structure and by a particularly simple assembly.

In a second version, a spring element is arranged in a particularly advantageous manner on the carrying part, said spring element exerting a spring force on the latching element. Via this embodiment, the optimal design of both the spring element for generating the spring force and of the latching element for ensuring the latching is achieved.

Furthermore, it is possible to realize the spring force by means of a combination of an additional spring element with an elastically deformable latching element. Also, it is immaterial whether the spring element is mounted as a separate, loose component or whether the spring element is an elastic component on the latching element and thus integrally connected thereto, for example made from two different material components. For the selection of the spring element, various options are available to the skilled person, wherein he has to decide between an, in the simplest case, pressure spring or a leaf spring or he can also use an elastomer.

Furthermore, it is particularly advantageous if the latching element is mounted pivotably in the carrying part, the pivot axis extending perpendicularly to the joining direction. Thus, the latching element performs a curved path motion when being operated via the operating element and when being reset by means of the spring force. The same is true for the embodiment comprising an elastically deformable latching element, in which a resulting pivot axis extends perpendicularly to the joining direction. In this context, the resulting pivot axis relates to the curved path motion of the latching surface of the latching element. Thus, it further becomes obvious that a changing angle arises between the joining direction and the normal vector when the operating surface is advantageously designed and when the normal vector thereof is thus defined in the course of the operation or of the motion between the unlocked position and the locked position. It is particularly advantageous herein if the pivot axis is arranged on the side of the latching element facing the handle part. By means of this arrangement of the pivot axis, a particularly advantageous predetermination of the operation of the operating surface and of the normal vector with the advantageous angle range is made possible.

It is basically necessary that the handle part mounted to the carrying part is attached thereto in a secure and reliable manner, i.e. not detachable without operation. This can be achieved in a particularly advantageous manner if the force vector resulting from the bearing between the latching surface and the abutment in the locked position extends in the proper direction. Here, it is important to select the angle between the force vector and a connecting line between the bearing of latching surface to the abutment and the pivot axis to be smaller than the friction angle and/or to make sure that the force vector runs past the pivot axis on the side facing the operating element. For a better understanding regarding the position of the force vector, of the connecting line and of the angles, reference is made to the figures and the accompanying description. By means of this orientation of the force vector, a pulling motion between the carrying part and the handle part does not lead to a detaching unlatching motion of the latching element, but instead the latching element is blocked in the locked position.

Further, it is particularly advantageous if the operating element is mounted pivotably in a mounting receptacle. By mounting the operating element in a pivotable manner, in particular a clamping during operation can be excluded. For realizing the mounting receptacle and for a simplified assembly, a cover mounted to the handle part is used in a particularly advantageous manner, which at the same time forms the mounting receptacle in sections. Thus, the operating element can be mounted to the handle part in a simple manner in that the former is inserted into a first mounting shell on the handle part and the mounting receptacle is formed by applying the cover. A clipped-on plastic cover can advantageously be used for forming the cover, positively influencing the cost of manufacture and the assembly. When arranging the mounting receptacle, it is important to orient the pivot axis perpendicularly to the joining direction so that a user can handle the operating element intuitively. Furthermore, this position of the pivot axis facilitates the force transmission from the operating element to the latching element for the process of unlocking. It is particularly advantageous if the pivot axis is arranged on the side facing away from the carrying part since the user can thus carry out a motion starting at the handle part, i.e. a pushing motion, on the operating element.

For realizing the connection between the carrying part and the handle part, it is particularly advantageous if the carrying part comprises a carrying portion tapering in the manner of a truncated pyramid and if the handle part comprises a complementary sleeve portion. Thus, in a simple manner, the handle part can be pushed with the sleeve portion onto the carrying portion of the carrying part in the joining direction. Owing to the embodiment in the shape of a truncated pyramid, the possibility of a free pushing motion as far as into the end position is guaranteed without the risk of clamping or canting. The carrying portion in the shape of a truncated pyramid and the complementary sleeve portion herein define the free space within which the parts can be moved in principle towards each another when being joined. In this context, is immaterial whether the sleeve portion has a greater depth than would correspond to the length of the carrying portion.

In the embodiment comprising a conically extending carrying portion, it is advantageous to select the conicity in the range between 3° and 15°. Here, a range between 5° and 10° is particularly advantageous. By selecting the conicity in this manner, one the one hand, the easy joining is ensured and, at the same time, this connection between the handle part and the carrying part provides for a stable connection and thus for an ensured force transmission, the handling of heavy cooking vessels thus being equally possible in an equal manner.

Since the intended purpose of the fitting part envisages the removal of the handle part, it is obvious that the carrying part can be present standing alone on the useful object or vessel. To prevent a risk of injury, for an advantageous optical design and to reduce the deposition of dirt, it is particularly advantageous if the carrying portion and/or the carrying part have a closed structure. This is basically supposed to mean that the carrying portion has a closed surface, preferably structured as simply as possible, towards the surrounding sides and to the front side. Functionally, for the latching element, a latching element opening is thus required in the carrying portion, which however is again filled and/or covered by the latching element.

It is particularly advantageous if at least the carrying portion is manufactured from a stainless metal, in particular from a cast material. Selecting a stainless metal is advantageous insofar as, on the one hand, the strong forces can be transmitted without damage and, on the other hand, there is no danger of corrosion in the use of cooking or roasting vessels. Further, it is advantageous if, at the sleeve portion, at least the abutment has a higher hardness and abrasion resistance than the other material of the sleeve portion, in particular if it is made of a hard metal. Due to the functionally envisaged removability of the handle part from the carrying part and the consequential relative motion between the latching element and the abutment, the largest degree of wear and the highest surface pressure may occur at the abutment.

Furthermore, it is advantageous if during the joining of the handle part with the carrying part, the latching element goes automatically from the locked position into to the unlocked position and subsequently the locking takes place. In this regard, a sliding of the operating surface along a front edge and/or a front end portion of the sleeve portion is required at least in the first path portion when pushing the sleeve portion onto the carrying portion. Due to the shape of the operating surface having a course inclined with respect to the joining direction, this leads to the latching element being pushed down simultaneously with being pushed on. Further, a sliding of the latching surface along the abutment is required at least in the final path portion, the latching element being lifted into the locked position by means of the spring force.

Due to this advantageous embodiment of the latching element and of the sleeve portion, it is made possible that no operation of the operating element or of the latching element is necessary when pushing the handle part onto the carrying part. Instead, the latching element is pushed automatically from the locked position down into the unlocked position and it enters the locked position again in the end position.

In the following figures, a particularly advantageous embodiment of a fitting part according to the invention is outlined.

FIG. 1 shows a longitudinal section through an exemplary embodiment of a fitting part 01 according to the invention in a perspective view with the handle part 07 and the carrying part 02;

Figure 1:
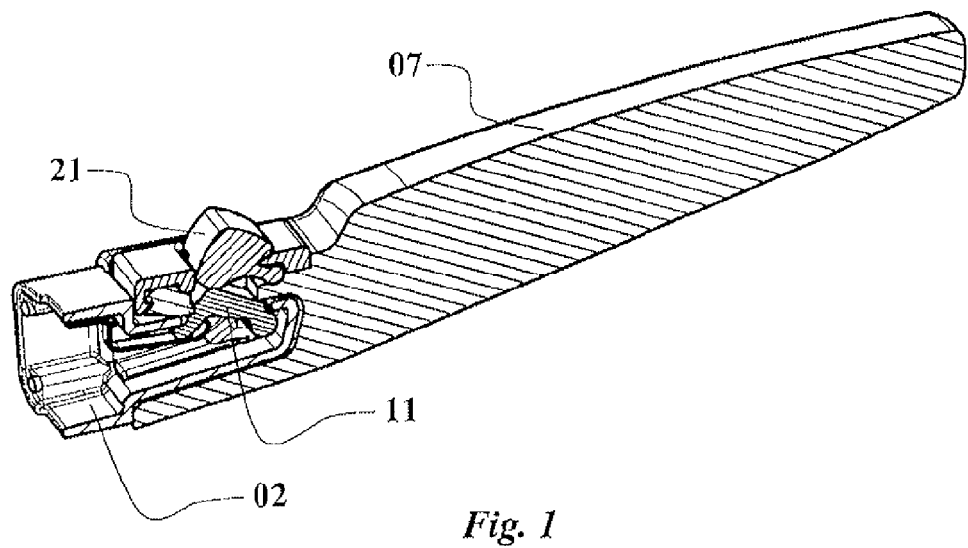
Figure 5:
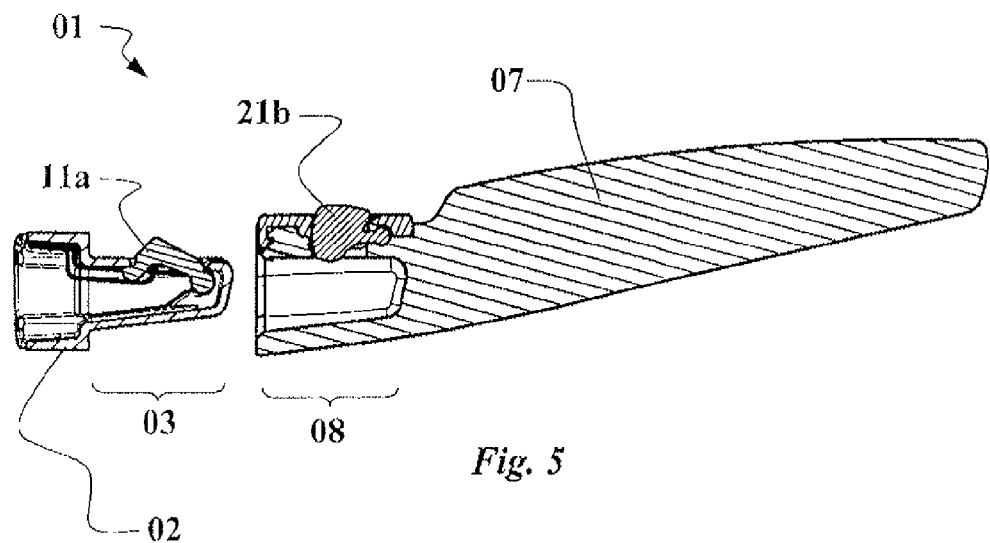
Figure 6:
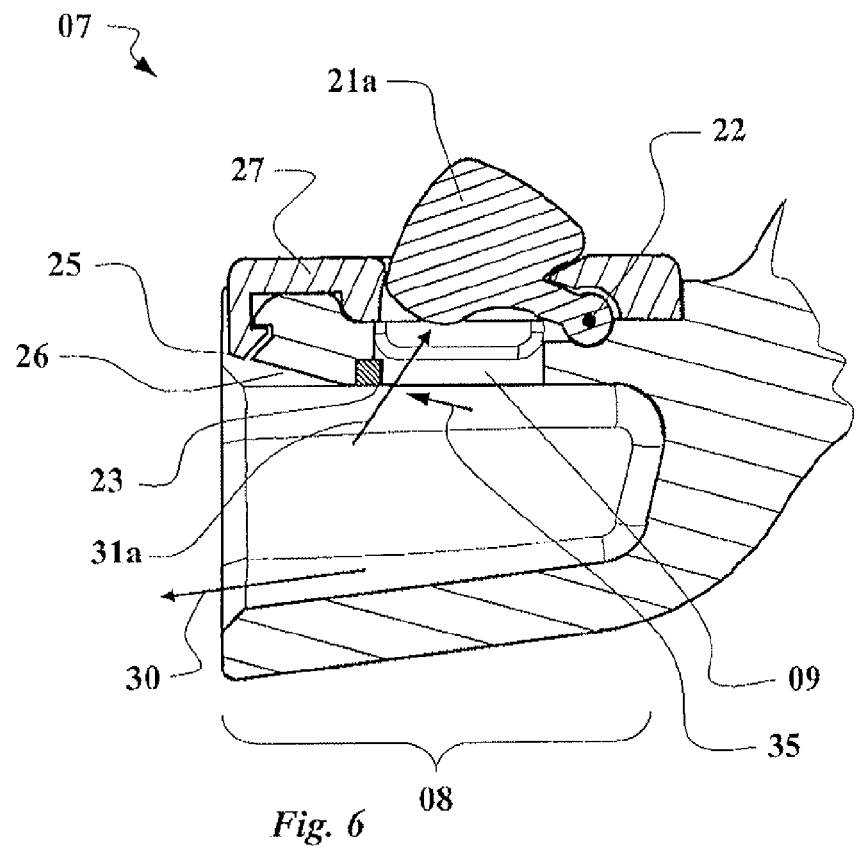
Figure 7:
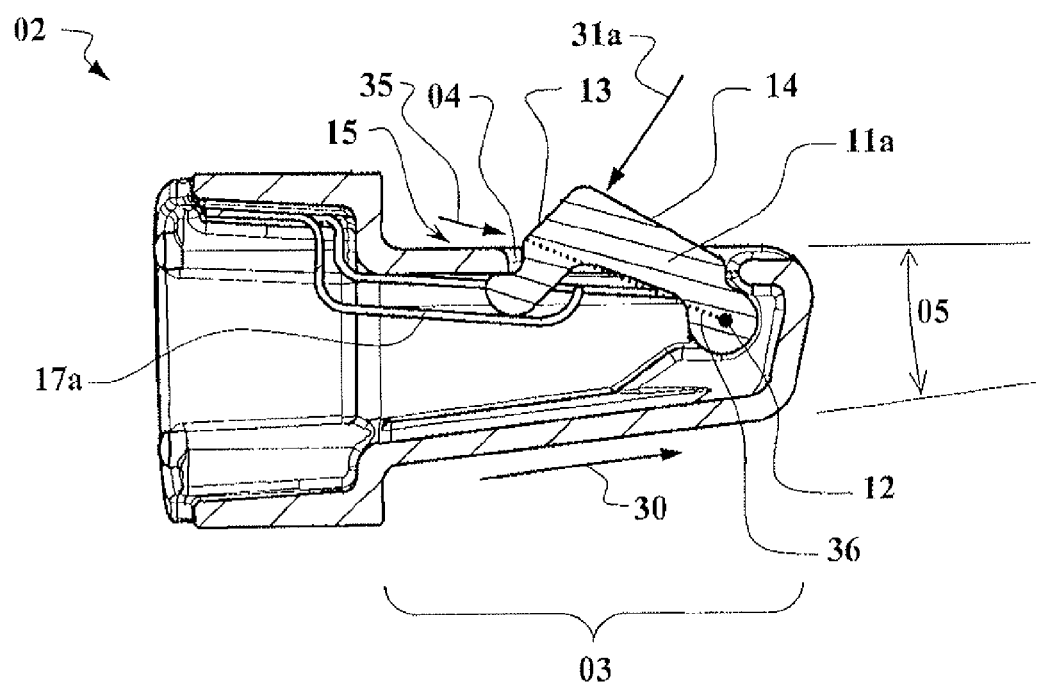
Figure 8:
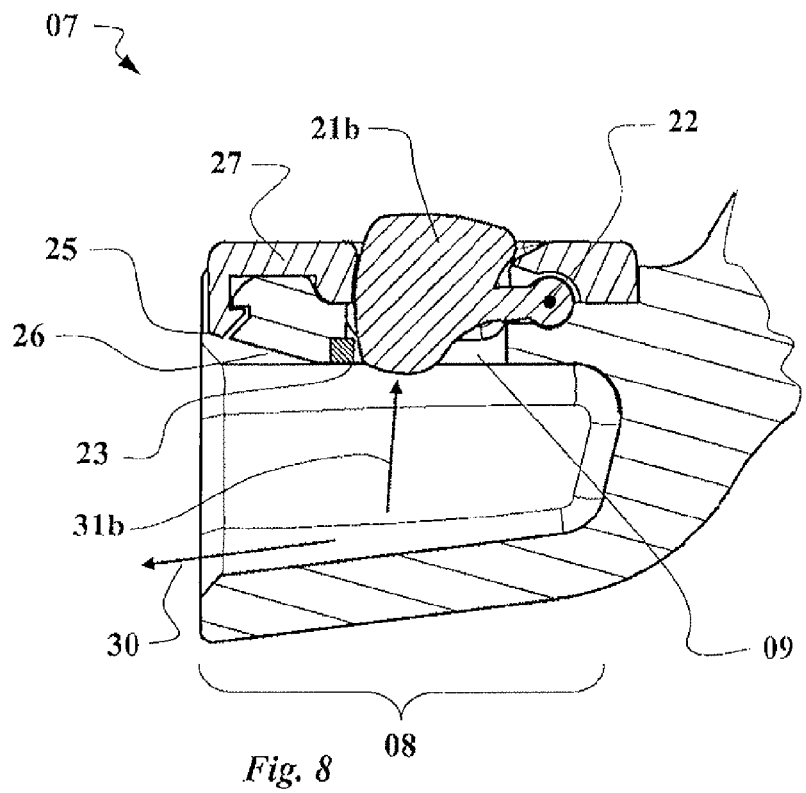
Figure 9:
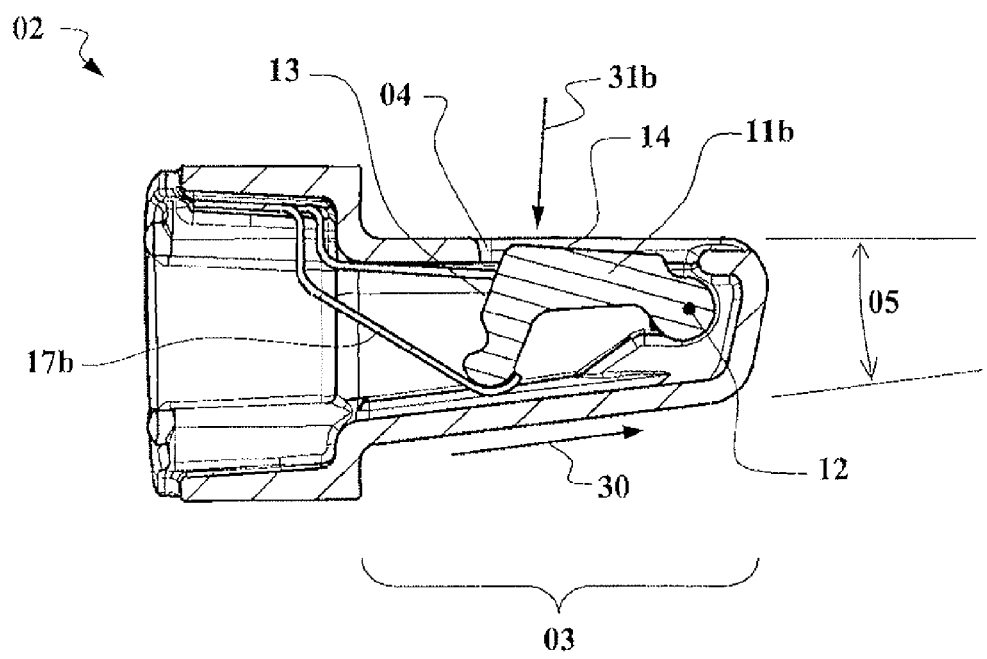
Figure 10A:
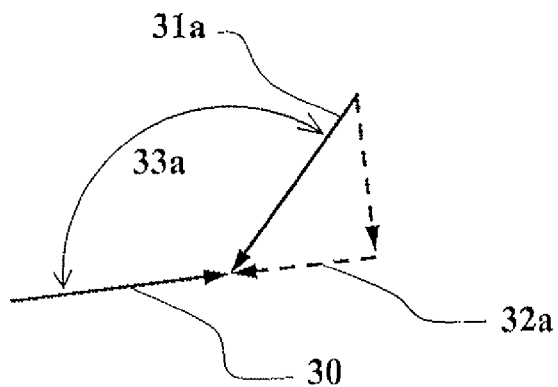
Figure 10B:
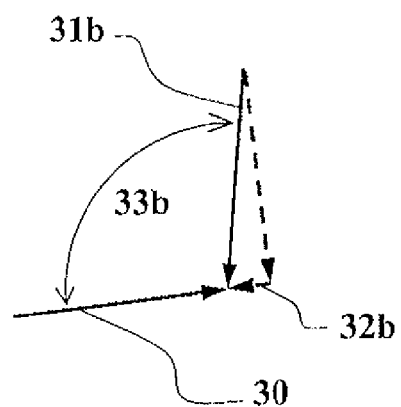
Figure 11:
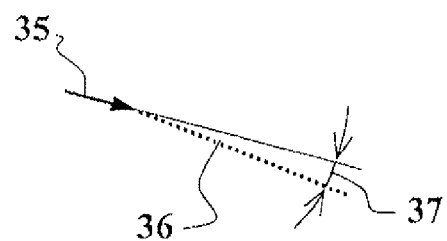

FIG. 5 shows the fitting part 01 of FIG. 1 after the handle part 07 has been taken off the carrying part 02;

FIG. 6 shows a detailed view of the handle part 07 in the locked position;

FIG. 7 shows the carrying part 02 in the locked position;

FIG. 8 shows the handle part 07 in the unlocked position;

FIG. 9 shows the carrying part 02 in the unlocked position;

FIG. 10 and FIG. 11 show views of the resulting vectors and angles.

FIG. 1 shows a longitudinal section through an exemplary design of a particularly advantageous embodiment of a fitting part 01 according to the invention in a perspective view. On the right-hand side, the handle part 07 can be seen and on the left-hand side, the carrying part 02 is visible. The associated vessel, which, as is obvious to the skilled person, would in practice adjoin the carrying part 02, is not illustrated. The latching element 11 and the operating element 21 are the substantial elements of the embodiment according to the invention. The advantageous positioning of the operating element 21 on the handle part 07 and of the latching element 11 on the carrying part 02 can be seen. In this embodiment, the required spring force on the latching element 11 is generated by means of an additionally mounted leaf spring 17.

Figure 2:
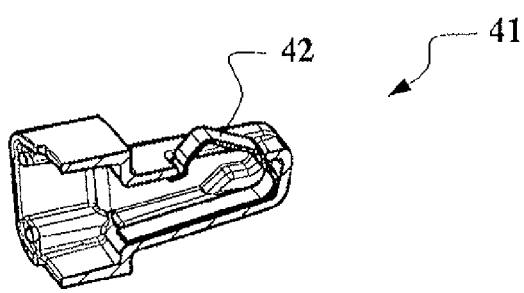
FIG. 2 shows an alternative embodiment of a carrying part 41.

Alternatively, FIG. 2 shows an example of a carrying part 41 in which the latching element 42 is also the spring element. Thus, said latching spring element 42 is implemented overall as a leaf spring so that there is no need to assemble and produce two separate components.

Figure 3:
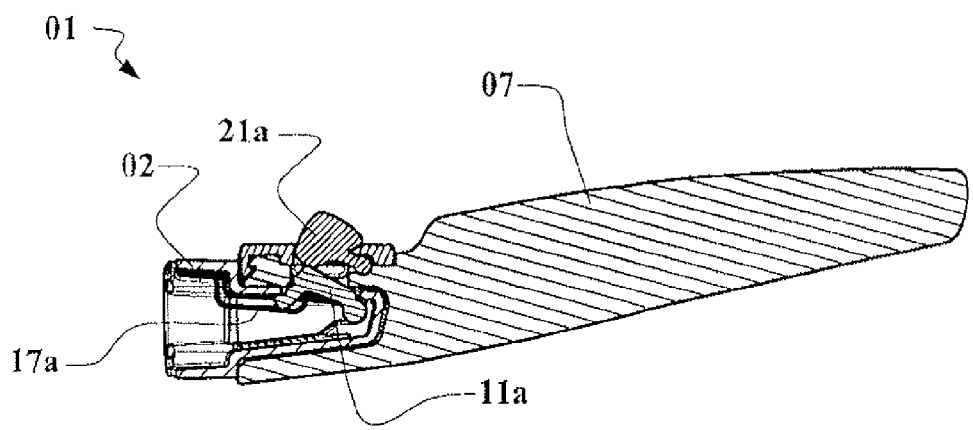
FIG. 3 shows the fitting part 01 of FIG. 1 in a pushed-on position.

FIG. 3, once more, shows the fitting part 01 of FIG. 1 in the locked position. Again, the handle part 07, the carrying part 02, the latching element 11a and the operating element 21a can each be seen in the locked position. Moreover, the position of the spring element 17a is visible in the locked position, the latter being implemented as a leaf spring. It is obvious how the unlocking can be carried out by the user. For this purpose, the operating element 21 is to be pushed down starting from the locked position.

Figure 4:
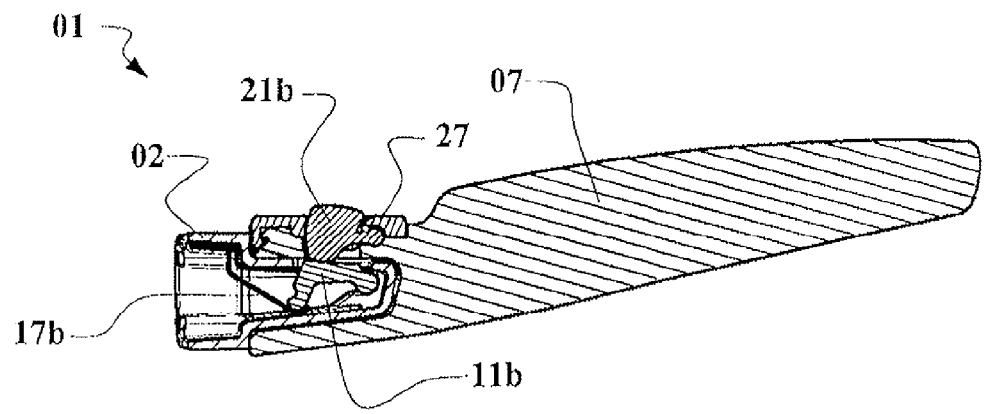
FIG. 4 shows the fitting part 01 of FIG. 1 during unlocking.

Said operation results in the unlocked position outlined in FIG. 4. Accordingly, the latching element 11b, the operating element 21b and the spring element 17b are in the unlocked position. In this position, the handle part 07 can now be pulled off the carrying part 02, wherein a "pulling off" is not required in an advantageous embodiment since, instead, an automatic impulsive detachment of the carrying part 02 from the handle part 07 takes place.

FIG. 5 additionally shows the fitting part 01 after the handle part 07 has been removed from the carrying part 02. The joining portions with the carrying portion 03 on the carrying part 02 and with the complementary sleeve portion 08 on the handle part 07 are clearly shown. Due to the effective spring force of the spring element 17a, the latching element 11a is unabatedly pressed up into the locked position. In contrast, the operating element 21b is mounted freely in this exemplary embodiment so that owing to gravity it remains in the unlocked position.

For joining the handle part 07 on the carrying part 02, the figure sequence merely needs to be viewed vice versa, starting from FIG. 5 to FIG. 3. Thus, it becomes obvious how by sliding the handle part 07 onto the carrying part 02, the latching element 11a is at first pushed down starting from the locked position by coming to bear in the sleeve portion and how it arrives in the unlocked position 11b. From this moment on, the operating element 21b bears against the latching element 11b, wherein, subsequently, the latching element 11b together with the operating element 21b is lifted by the spring force of the spring element 17b, starting from the unlocked position and returning into the locked position 11a and 21a, respectively.

In FIG. 6, the handle part 07 is again outlined in detail in the area of the sleeve portion 08 in the state of the locked position. First of all, the sleeve portion 08 complementary to the carrying portion 03 is visible. The operating element 21a is in the locked position, i.e. in the upper position. The mounting about the pivot axis 22 is visible as well. In this context, the mounting receptacle is formed by the handle element itself and by a clipped-on plastic cover 27. In the forward area of the sleeve portion 08, on the side facing towards the operating element 21a, the front end portion 26 is formed as a lead-in chamfer. The end of said lead-in chamfer is formed by the front edge 25 of the sleeve portion 08. It is obvious how, first, the front edge 25 and then the front end portion 26 slide over the latching element 11 when the sleeve portion 08 of the handle part 07 is joined to the carrying portion 03 of the carrying part 02 and how, starting from the elevated locked position, the front end portion 26 moves the latching element 11 into the pushed-down unlocked position as a result of the joining motion. Furthermore, the abutment 23 is outlined, an inserted hard metal element being sketched here. As a function of the requirement regarding the frequency of removal of the handle element 07 from the carrying element 02 and of the occurring weights and forces, it can become necessary to provide corresponding measures for increasing the abrasion resistance and compression strength of the abutment 23.

Within the handle part 07, an operating element opening 09 is located in the area of the sleeve portion 08, into which the operating element 21 is inserted. By means of this operating element opening 09, the operating element 21 can bear against the latching element 11.

The substantial advantage of this particular embodiment lies in the resulting vectors. In this context, it is substantial for achieving a particularly advantageous functionality that the joining direction 30 forms an obtuse angle with the normal vector 31a. The joining direction is defined functionally by the bearing of the sleeve portion 08 against the complementary surface of the carrying portion 03 on the side opposite of the operating element 21. This is caused by the fact that during the removal and also during the joining process, a force is directed at the latching element which pushes down the carrying part 02 relative to the handle part 07 and thus causes a corresponding bearing. While even surfaces have been selected in this exemplary embodiment, this does not have to be the case. It would also be conceivable to provide slightly curved surfaces or surfaces deviating otherwise from a straight line as the contact surface between the sleeve portion 08 and the carrying portion 03. Further, in the joined state between the latching element 11 and the abutment 23, a pressure force is effective in each case in the direction of the force vector 35.

FIG. 7 shows the carrying element 02 of the embodiment of FIG. 1 in the locked position. First, again, the carrying portion 03 is visible in an embodiment having the shape of a truncated pyramid with the conicity 05. In this context, the carrying portion is substantially completely closed, i.e. there is neither an opening at the surrounding sides nor at the front end apart from the necessary latching element opening 04. In this context, said latching element opening 04 is substantially completely filled or covered by the latching element 11. Thus, in combination with the latching element 11, the carrying part 02 appears closed. This is particularly advantageous for a user since thus a special look is achieved and, additionally, a risk of injury due to open holes or protruding edges is prevented. The latching element 11a is mounted pivotably in the pivot axis 12 in the carrying part 02. In this context, the latching element 11a has the operating surface 14 on the side facing the operating element 21 and it has the latching surface 13 on the side facing the abutment 23. It is obvious how the operating surface 14 first slides along the front edge 25 and along the front end portion 26 of the sleeve portion 08 and is pushed down in the process when the handle part 07 is joined with the carrying part 02. When arriving at the abutment, the latching element 11a is consequently lifted due to the inclined arrangement of the latching surface 13 and, sliding along the abutment 23, it returns to the locked position. The lifting of the latching element 11a is herein caused by the spring element 17a arranged in the carrying part 02. The defined end position of the latching element 11a relative in the carrying portion 02 is secured by a stop 15. Complementary to the vectors on the handle part 07, the joining direction 30 as well as the normal vector 31a and the force vector 35 appear here.

In contrast to FIG. 6, FIG. 8 shows the handle part 07 in the unlocked position. With regard to the handle part 07, this also is the normal position when the handle part 07 is taken off the carrying part 02. The operating element 21b inserted into the operating element opening 09 is visible in the lower position. Correspondingly, the normal vector 31b is displaced as an orthogonal vector in the contact between the operating element 21b and the latching element 11b.

In analogy to FIG. 7, FIG. 9 now shows the carrying part 02 in the unlocked position. In this context, the latching element 11b is correspondingly lowered and the normal vector 31b is consequently oriented opposite to the situation in FIG. 8. The now elastically deformed spring element 17b is visible, too. It is obvious that this position is taken by the latching element 11b only when a force acting from the outside pushes down said latching element 11b. Otherwise, the normal position is the locked position as outlined in FIG. 7.

To clarify the meaning of the different vectors, FIG. 10a outlines them in the locked position. In this context, the joining direction 30 forms an obtuse angle 33a with the normal vector 31a. Said obtuse angle is to be selected with regard to the implementation of the operating surface 14 and to the design of the operating element 21 preferably in such a manner that an angle of greater than 98°, in this locking position in particular of greater than 120°, is achieved. However, since an increasing angle impedes the unlocking process, it is important not to select it too large so that in particular an angle of below 150°, in particular of below 130°, is particularly advantageous. The special effect of this advantageous embodiment can further be recognized from the resulting forces. The normal vector corresponds to an operating force acting from the operating element perpendicularly on the latching element. Thus, a force is acting between the handle part 07 and the carrying part 02 in the direction of the normal vector 31a. This force can now be divided into an effective direction perpendicular to the joining direction 30 and against the joining direction 30 in the form of an extension force 32a. Its proportion is relevant for an initially unexpected effect occurring in this embodiment: during operation via the operating element 21, an impulsive detachment of the carrying part 02 from the handle part 07 takes place, the impulse being caused mainly by the extension force 32a. During the course of the operation, the normal vector 31b shifts into the unlocked position. In this context, the normal vector 31a stands substantially more steeply on the joining direction 30, an obtuse angle 33b remaining present. Thus, an extension force 32b is exerted in the unlocked position as well.

In conclusion, FIG. 11 outlines the advantageous orientation of a force vector 35 as the resulting direction in the bearing of the latching element 11a with the latching surface 13 against the abutment 23. In this context, it is important to orient the force vector 35 in such an advantageous manner that, optionally, it extends closely to the pivot axis 12 or runs past the pivot axis 12 on the side towards the operating element 21. In particular for securing the self-restraint by means of a form-fit, it is important to select the occurring angle 37 between the force vector 35 and a connecting line 36 between the bearing point and the pivot axis 12 smaller than the friction angle which arises due to friction from the material pairing between the latching surface 13 and the abutment 23. Thus, it is obvious that the latching surface 13 does not necessarily have to be a plane surface, either, but instead can have a course deviating therefrom. In particular, it is consequently possible to implement the latching surface 13 in the end portion, i.e. in the locked position, as having an orientation or shape deviating from the usual latching surface.

The invention claimed is:

1. A fitting part for manually handling a vessel, comprising:
a carrying part fixedly connected to at least a portion of a wall of a vessel;
a handle part detachably contacted with the carrying part in a joining direction
wherein when the carrying part and handle part are detachably contacted, a latching device is formed, the latching device including a latching element on the carrying part capable of moving by a spring force from an unlocked position into a locked position, and wherein the latching element in the locked position contacts an abutment on the handle part in order to prevent the handle part from separating from the carrying part, and wherein an operating element of the handle part is capable of contacting the latching element for unlocking the latching device by moving the latching element from contacting the abutment; and the spring force is generated by a spring in the carrying part.

2. The fitting part of claim 1, wherein the operating element contacts an operating surface of the latching element, and wherein the joining direction and an orthogonal normal vector form an obtuse angle with the operating surface, the normal vector corresponding to an operating force acting from the operation element perpendicularly on the latching element.

3. The fitting part of claim 2, wherein the obtuse angle is greater than 98°, and the obtuse angle is greater than 120° in the locked position.

4. The fitting part of claim 2, wherein an operation of the operating element leads to an operating force in the direction of the normal vector, the operating force comprising an extension force acting against the joining direction.

5. The fitting part of claim 1, wherein the latching element is elastically deformable and forms the spring.

6. The fitting part of claim 1, wherein the latching element is mounted in the carrying part in one or more of a pivotable manner and deformable manner, a pivot axis extending perpendicularly to the joining direction, the pivot axis being arranged in particular on a side of the latching element facing the handle part.

7. The fitting part of claim 6, wherein in the locked position, an angle between a force vector, resulting from a latching surface contacting the abutment, and a connecting line from the contacting of the latching surface and the abutment to the pivot axis is smaller than one or more of a friction angle and a force vector extending on a side of the pivot axis facing the operating element.

8. The fitting part of claim 1, wherein the operating element is mounted pivotably in a mounting receptacle, the mounting receptacle formed in sections by a cover attached to the handle part, and a pivot axis extending perpendicularly to the joining direction.

9. The fitting part of claim 1, wherein the carrying part comprises a carrying portion tapered from a proximal end to a distal end and the handle part comprises a complementary sleeve portion.

10. The fitting part of claim 9, wherein a conicity of the carrying portion is in a range between 3° and 15.

11. The fitting part of claim 9, wherein the carrying portion together with the latching element has a substantially closed structure.

12. The fitting part of claim 9, wherein the carrying portion is manufactured from a stainless metal.

13. The fitting part of claim 9, wherein in a first path portion, the latching element slides with an operating surface along one or more of a front edge and along a front end portion of the sleeve portion when the sleeve portion is pushed onto the carrying portion, the latching element pressed down into the unlocked position, and, in a final path portion, the latching element slides with a latching surface along the abutment, the latching element lifted into the locked position.

14. The fitting part of claim 9, wherein a conicity of the carrying portion is in a range between 5° and 10°.

15. The fitting part of claim 9, wherein the carrying portion has a closed surface towards the surrounding sides and to the front side, and the latching element opening is filled, covered, or both, by the latching element.

16. The fitting part of claim 9, wherein the carrying portion is manufactured from a cast material.

17. The fitting part of claim 9, wherein the abutment on the handle part has a greater hardness and abrasion resistance than any other material of the handle part.

18. The fitting part of claim 9, wherein the abutment on the handle part is made of a hard metal.

\* \* \* \* \*